US010733678B2

(12) United States Patent
Kapoor et al.

(10) Patent No.: US 10,733,678 B2
(45) Date of Patent: Aug. 4, 2020

(54) SYSTEMS AND METHODS FOR PREDICTING PAGE ACTIVITY TO OPTIMIZE PAGE RECOMMENDATIONS

(71) Applicant: Facebook, Inc., Menlo Park, CA (US)

(72) Inventors: Komal Kapoor, Bellevue, WA (US); Jonathan Daniel Sorg, Emeryville, CA (US); Bradley Ray Green, Snohomish, WA (US); Jason Brewer, Kirkland, WA (US); David Tomotsu Sasaki, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 715 days.

(21) Appl. No.: 14/981,029

(22) Filed: Dec. 28, 2015

(65) Prior Publication Data

US 2017/0186101 A1 Jun. 29, 2017

(51) Int. Cl.
*G06Q 10/00* (2012.01)
*G06Q 50/00* (2012.01)

(52) U.S. Cl.
CPC .................................... *G06Q 50/01* (2013.01)

(58) Field of Classification Search
CPC combination set(s) only.
See application file for complete search history.

(56) References Cited

U.S. PATENT DOCUMENTS 8,447,852 B1 * 5/2013 Penumaka ............. G06Q 50/01 709/217
2010/0030722 A1 * 2/2010 Goodson ................ G06Q 30/02 706/54
2013/0018893 A1 * 1/2013 Nelson ................... G06Q 30/02 707/748
2013/0096981 A1 * 4/2013 Evans ................ G06Q 30/0201 705/7.29
2015/0046528 A1 2/2015 Piepgrass et al.
2015/0082183 A1 * 3/2015 Hale ................. G06F 17/30867 715/738
2015/0254568 A1 * 9/2015 Zhao .................... G06N 99/005 706/12
2016/0307101 A1 * 10/2016 Zhang .................... G06Q 50/01

OTHER PUBLICATIONS

Bethune, Aaron. "Fan Profiling". Canadian Musician; Nov./Dec. 2014; 36, 6.*

* cited by examiner

*Primary Examiner* — Gabrielle A McCormick
(74) *Attorney, Agent, or Firm* — Sheppard Mullin Richter & Hampton LLP

(57) ABSTRACT

Systems, methods, and non-transitory computer-readable media can determine a plurality of candidate entities for recommendation to a user of a social networking system. A predicted activity objective value model configured to calculate activity stores for candidate entities is established. The activity score is indicative of the probability of future activity on the social networking system by a candidate entity. A first activity score is determined for each of the plurality of candidate entities based on the predicted activity object value model and a first set of feature values. A second activity score is determined for each of the plurality of candidate entities based on the predicted activity object value model and a second set of feature values that is different from the first set of feature values. A first entity is selected of the plurality of candidate entities based on the first and second activity scores.

17 Claims, 7 Drawing Sheets

SYSTEMS AND METHODS FOR PREDICTING PAGE ACTIVITY TO OPTIMIZE PAGE RECOMMENDATIONS

FIELD OF THE INVENTION

The present technology relates to the field of social networks. More particularly, the present technology relates to predicting page activity to optimize page recommendations.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

Users of a social networking system can connect with other users on the social networking system. In addition to connecting with other individual users, users of a social networking system may also form connections, associations, or other relationships with non-individual entities. For example, users may choose to connect with a neighborhood restaurant, a musical group, or a non-profit organization. Social networking systems value these user-to-entity connections because better-connected entities tend to use the social networking system more, thus providing a more robust social network with more content, increased user-engagement, and increased advertising opportunities.

SUMMARY

Various embodiments of the present disclosure can include systems, methods, and non-transitory computer readable media configured to determine a plurality of candidate entities for recommendation to a user of a social networking system based on candidate criteria. A predicted activity objective value model configured to calculate activity stores for candidate entities is established. The activity score is indicative of the probability of future activity on the social networking system by a candidate entity. A first activity score is determined for each of the plurality of candidate entities based on the predicted activity object value model and a first set of feature values. A second activity score is determined for each of the plurality of candidate entities based on the predicted activity object value model and a second set of feature values that is different from the first set of feature values. A first entity is selected of the plurality of candidate entities based on the first and second activity scores.

In an embodiment, the first set of feature values comprises a first number of followers value indicative of a current number of followers for each of the plurality of candidate entities, and the second set of feature values comprises a second number of followers value, in which the first number of followers value is increased.

In an embodiment, the method further comprises determining an activity score delta for each of the plurality of candidate entities, the activity score delta comprising a difference of the second activity score and the first activity score for each of the plurality of candidate entities. Furthermore, selecting a first entity of the plurality of candidate entities is based on the activity score deltas.

In an embodiment, the method further comprises determining an estimated activity value for each of the plurality of candidate entities, the estimated activity value comprising a product of the activity score delta and a conversion probability for each of the plurality of candidate entities. Furthermore, selecting a first entity of the plurality of candidate entities is based on the estimated activity values.

In an embodiment, selecting a first entity of the plurality of candidate entities comprises ranking the plurality of candidate entities based on the estimated activity values.

In an embodiment, determining a plurality of candidate entities for recommendation to a user of the social networking system comprises determining a plurality of candidate entities that are not connected to the user on the social networking system.

In an embodiment, the method further comprises causing an entity recommendation identifying the first entity to be presented to the user through a user device.

In an embodiment, the method further comprises causing an entity page on the social networking system associated with the first entity to be presented to the user based on a selection by the user.

In an embodiment, the method further comprises causing the user to connect with an entity page on the social networking system associated with the first entity based on a selection by the user.

In an embodiment, establishing a predicted activity objective value model comprises training a gradient boosting decision tree.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

The figures depict various embodiments of the disclosed technology for purposes of illustration only, wherein the figures use like reference numerals to identify like elements.

Figure 1:
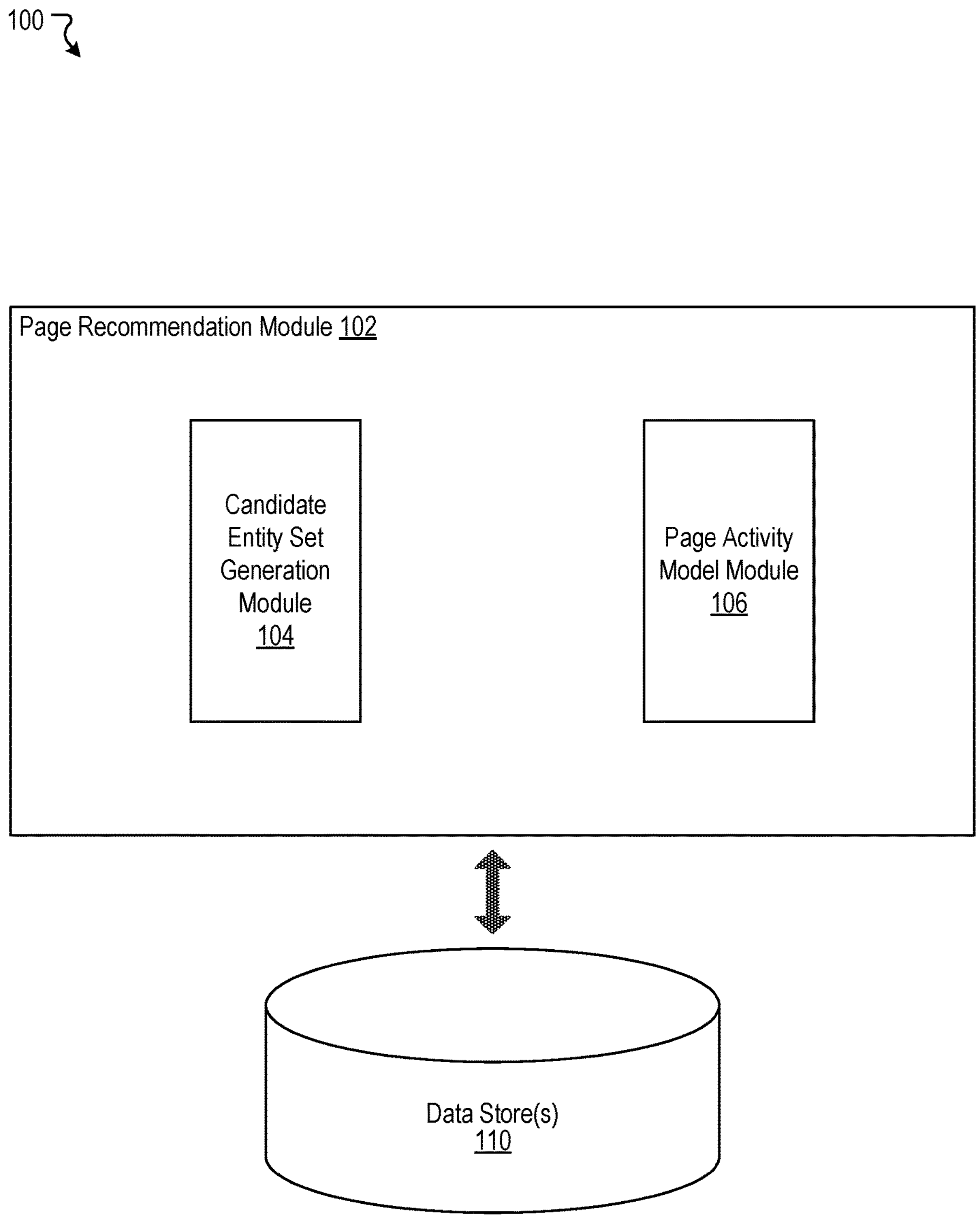
FIG. 1 illustrates an example system including a page recommendation module, according to an embodiment of the present disclosure.

One skilled in the art will readily recognize from the following discussion that alternative embodiments of the structures and methods illustrated in the figures can be employed without departing from the principles of the disclosed technology described herein.

DETAILED DESCRIPTION

Social Network Entity Page Recommendations

People use computing devices (or systems) for a wide variety of purposes. Computing devices can provide different kinds of functionality. Users can utilize their computing devices to produce information, access information, and share information. In some cases, users can utilize computing devices to interact or engage with a conventional social networking system (i.e., a social networking service, a social network, etc.). For example, users can add friends or contacts, provide, post, or publish content items, such as text, notes, status updates, links, pictures, videos, and audio, via the social networking system.

Users of a social networking system can connect and interact with other users on the social networking system. In addition to connecting and interacting with other individual users, users of a social networking system may also interact or connect with non-individual entities. Non-individual entities may include, for example, groups, organizations, objects, animals, celebrity pages, fan pages, corporations, companies or business, and the like. For example, users may choose to connect with a neighborhood restaurant, a musical group, or a non-profit organization. Social networking systems value these user-to-entity connections because better-connected entities tend to use the social networking system more, thus providing a more robust social network with more content, increased user-engagement, and increased advertising opportunities.

It continues to be an important interest for a social networking system rooted in computer technology to maximize opportunities for individual users to interact with entities on the social networking system. However, it can be difficult to introduce users to entities with which they might be interested in interacting or forming a connection. Traditional approaches to entity or entity page recommendations suffer from several common drawbacks. For example, many recommendation systems skew toward making more recommendations for entities that already have many connections, as opposed to making recommendations for entities having few connections within the social networking system. This leads to a sub-optimal result for the social networking system and entities, as an additional "fan" for an entity with many fans is less valuable, to both the entity and the social networking system, than an additional fan for an entity with relatively few fans. Other traditional mechanisms for recommending entities focus on simply adding connections between users and entities without regard to the result of the recommended connections.

Therefore, an improved approach can be beneficial for overcoming these and other disadvantages associated with conventional approaches. Based on computer technology, the disclosed technology can provide a recommendation of an entity, or an entity's page on a social networking system (i.e., a page recommendation), based upon the benefit of providing the recommendation to the social networking system, the entity, and/or the user. Recommendations may be based upon an application of an objective value model to a set of candidate entities to determine those entities that, if recommended to a user, will result in a largest predicted benefit to the social networking system, the entity, and/or the user. In various embodiments, the benefit prediction determination made by the objective value model may be based, at least in part, on how likely a particular recommendation is to result in page activity by an administrator of the entity page. A model can be utilized to predict how likely a particular recommendation is to increase page activity by the administrator. It should be understood that where various embodiments discuss recommendations of a particular entity, the concepts disclosed herein can also be applied to recommendations of a page on a social networking system associated with the entity, and vice versa.

FIG. 1 illustrates an example system 100 including an example page recommendation module 102 configured to generate page recommendations, according to an embodiment of the present disclosure. The page recommendation module 102 can be configured to generate a set of candidate entities according to various candidate criteria. The page recommendation module 102 can also be configured to rank and/or filter the set of candidate entities based on one or more objective value models. In various embodiments, the page recommendation module 102 is configured to determine a ranked set of entities to be recommended to users that will create a maximum predicted increase in benefit to the social networking system. In various embodiments, the page recommendation module 102 is configured to determine a benefit to the social networking system based on likelihood of administrator activity as a result of a page recommendation.

As shown in the example of FIG. 1, the page recommendation module 102 can include a candidate entity set generation module 104 and a page activity model module 106. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

The candidate entity set generation module 104 can be configured to, for an individual user, generate a set of candidate entities for potential recommendation to the user based on various candidate criteria. For example, the candidate entity set generation module 104 can be configured to gather a set of entities that are not yet connected to the user, such that the candidate entity set comprises all entities that do not have a connection to the user. In another example, the candidate entity set can comprise all entities that do not have a connection to the user and have not been recommended to the user within a predetermined period of time, e.g., in the past week, month, or year. In various embodiments, the candidate entity set generation module 104 can be configured to generate a candidate entity set based on information stored by a social networking system (e.g., in the data store 110). For example, the candidate entity set generation module 104 can be configured to generate a candidate entity set based on social graph information.

Figure 2:
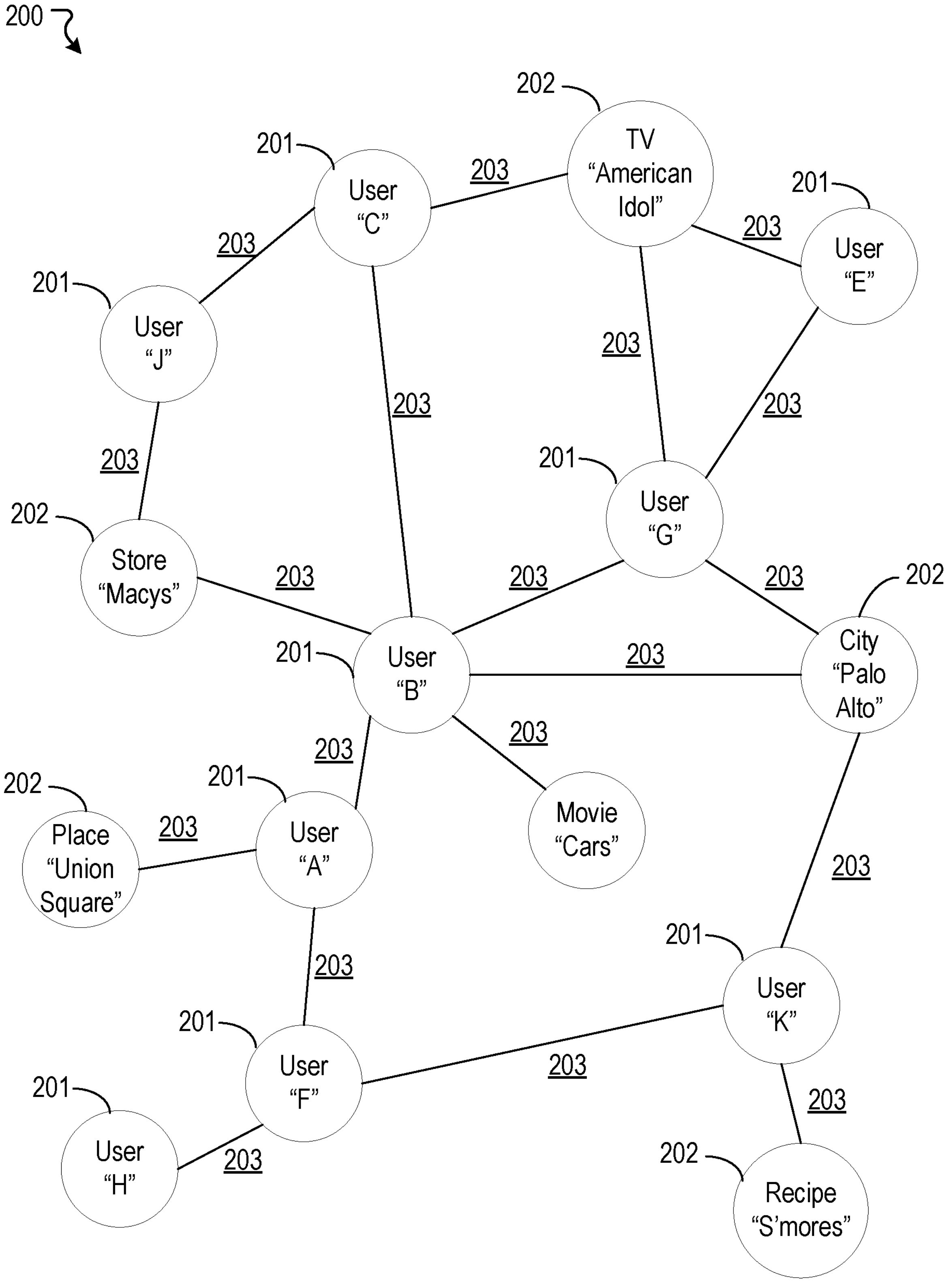
FIG. 2 illustrates an example scenario including an example social graph, according to an embodiment of the present disclosure.

FIG. 2 illustrates a simplified example of a social graph 200 comprising a plurality of user nodes 201 and a plurality of object nodes 202 according to an embodiment of the invention. A user node 201 of the social graph 200, in some embodiments, corresponds to a user of the social networking system. A user node 201 corresponding to a user may comprise information provided by the user and information gathered by various systems, including a social networking system. For example, the user may provide his or her name, profile picture, city of residence, contact information, birth date, gender, marital status, family status, employment, educational background, preferences, interests, and other demographic information to be included in or referenced by the user node 201.

As discussed briefly above, an object node 202 may correspond to an entity, concept, or other non-human thing including but not limited to an animal, a movie, a song, a sports team, a celebrity, a group, a restaurant, a place, a location, an album, an article, a book, a food, an Internet link, or a music playlist. An object node 202 may have a set of one or more "administrative" users, also referred to as "administrators" or "admins," for the object node that are granted permission, by the social networking system, to create or update the object node (or a page of the object node) by providing information related to the object (e.g., by filling out an online form), causing the social networking system to associate the information with the object node. For example and without limitation, information associated with an object node can include a name or a title of the object, one or more images (e.g., an image of cover page of a book), a web site (e.g., an URL address), and/or contact information (e.g., a phone number, an email address).

An edge between a pair of nodes represents a relationship or connection between the pair of nodes. For example, an edge between two user nodes can represent a friendship between two users. Additionally, an edge may have an associated "label" or "action", which describes the relationship between the nodes. For example, an edge between a user and an object node representing a city may have a label indicating that the user "lives" in the city, or an edge between a user and an object node representing a book may have an action indicating that the user has "read" the book.

A social networking system may provide a web page (or other structured document) for an object node (e.g., a restaurant, a non-profit organization, a celebrity), incorporating one or more selectable buttons (e.g., "like", "check in," "follow") in the web page. A user can access the page using a web browser hosted by the user's user device and select a button within the page, causing the user device to transmit to the social networking system a request to create an edge between a user node of the user and an object node of the object, thereby indicating a relationship between the user and the object (e.g., the user checks in a restaurant, or the user "likes" or "follows" a celebrity, etc.). For example, a user may provide (or change) his or her city of residence, causing the social networking system to create (and or delete) an edge between a user node corresponding to the user and an object node corresponding to the city declared by the user as his or her city of residence.

In the example of FIG. 2, social graph 200 may include user nodes 201, object nodes 202, and edges 203 between nodes. An edge 203 between a pair of nodes may represent a relationship (or an action) between the pair of nodes. For example, user "G" is a friend of user "B" and user "E", respectively, as illustrated by the edges between user nodes "G" and "B", and between user nodes "G" and "E." In another example, users "C", "E", and "G" watch (or "like" or "follow") TV show "American Idol", as illustrated by the edges between the "American Idol" object node and user nodes "C", "E", and "G", respectively. Similarly, the edge between the user node "B" and the object node "Palo Alto" may indicate that user "B" declares "Palo Alto" as his or her city of residence. The edge between the user node "B" and the object node "Macys" may indicate that user "B" likes or follows "Macys." Of course, social graphs can be much larger than social graph 200 illustrated in FIG. 2, and the number of edges and/or nodes in a social graph may be many orders of magnitude larger than that depicted herein.

Returning to FIG. 1, the candidate entity set generation module 104 can utilize social graph information to generate a candidate entity set. For example, the candidate entity set generation module 104 can generate a candidate entity set by gathering a set of entities within the social networking system that do not have a connection with the user, but are associated in some way with the user. For example, the candidate entity set generation module 104 may populate a set of candidate entities that are connected to (e.g., "liked" or "followed" by) a threshold number of the user's friends or connections on the social networking system. As another example, the candidate entity set generation module 104 may populate a set of candidate entities that share similar attributes with the user, such as sharing a common city, or being located within a distance of an address or geolocation of the user. In an embodiment, the candidate entity set generation module 104 may examine the object nodes that the user already has a connection to within the social networking system and include in the set of candidate entities additional non-connected entities that are similar to the already-connected entities (e.g., having a same category, name, characteristics, etc.).

In some embodiments, the candidate entity set generation module 104 generates a set of candidate entities by first creating a set of candidate users comprising friends of the user and/or friends of the user's friends who also share certain similar characteristics with the user and/or additional users in the social networking system that share similar characteristics with the user. By way of example, the similar characteristics may include, but are not limited to, users similar in age, the same gender, nearby or the same residence location, same or similar college or high school, same or similar graduation year, users checking into a social networking system from the same location at approximately the same time, etc. In these embodiments, the candidate entity set generation module 104 can create a set of entities that are connected to the set of candidate users, and remove from this set of entities any entities that the user is already connected to. Of course, while several configurations for generating sets of candidate entities are described, in certain embodiments, one configuration or multiple configurations may be used together to generate the candidate entity sets.

In various embodiments, the candidate entity set is generated for a user on a determined time schedule, e.g., periodically—such as hourly, daily, weekly, etc.—or at certain defined intervals, such as at midnight, noon, or 6 p.m. every day. In various embodiments, the candidate entity set can be generated for a user in response to particular actions taken by the user. For example, when the user logs in to a social networking system, or when the user requests a particular page, or when the user views a news feed on the social networking system. In various embodiments, the candidate entity set can be generated both according to a determined time schedule and also in response to particular actions taken by a user.

The page activity model module 106 can be configured to generate a predicted activity objective value model for predicting future administrator page activity based on various features and feature values. The page activity model module 106 can also be configured to apply the predicted activity objective value model to one or more candidate entities to rank and/or filter the candidate entities and/or select one or more candidate entities for recommendation to a user. The page activity model module 106 is discussed in greater detail herein.

Various additional embodiments, implementations, and features of recommendation systems, candidate entity set generation modules, and objective value models are discussed in U.S. Patent Application Publication No. 2015/0046528 to Piepgrass et al., published on Feb. 12, 2015 (hereafter "Piepgrass"), the entire contents of which are incorporated by reference as if fully set forth herein.

The page recommendation module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the page recommendation module 102 can be implemented, in part or in whole, as software running on one or more computing devices or systems, such as on a server computing system or a user (or client) computing system. For example, the page recommendation module 102 or at least a portion thereof can be implemented as or within an application (e.g., app), a program, or an applet, etc., running on a user computing device or a client computing system, such as the user device 610 of FIG. 6. In another example, the page recommendation module 102 or at least a portion thereof can be implemented using one or more computing devices or systems that include one or more servers, such as network servers or cloud servers. In some instances, the page recommendation module 102 can, in part or in whole, be implemented within or configured to operate in conjunction with a social networking system (or service), such as the social networking system 630 of FIG. 6. It should be understood that there can be many variations or other possibilities.

The page recommendation module 102 can be configured to communicate and/or operate with the at least one data store 110, as shown in the example system 100. The data store 110 can be configured to store and maintain various types of data. In some implementations, the data store 110 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 110 can store information that is utilized by the page recommendation module 102. For example, the data store 110 can store various objective value models, past social networking data, activity scores, estimate activity values, and the like, as described in greater detail herein. It is contemplated that there can be many variations or other possibilities.

Figure 3:
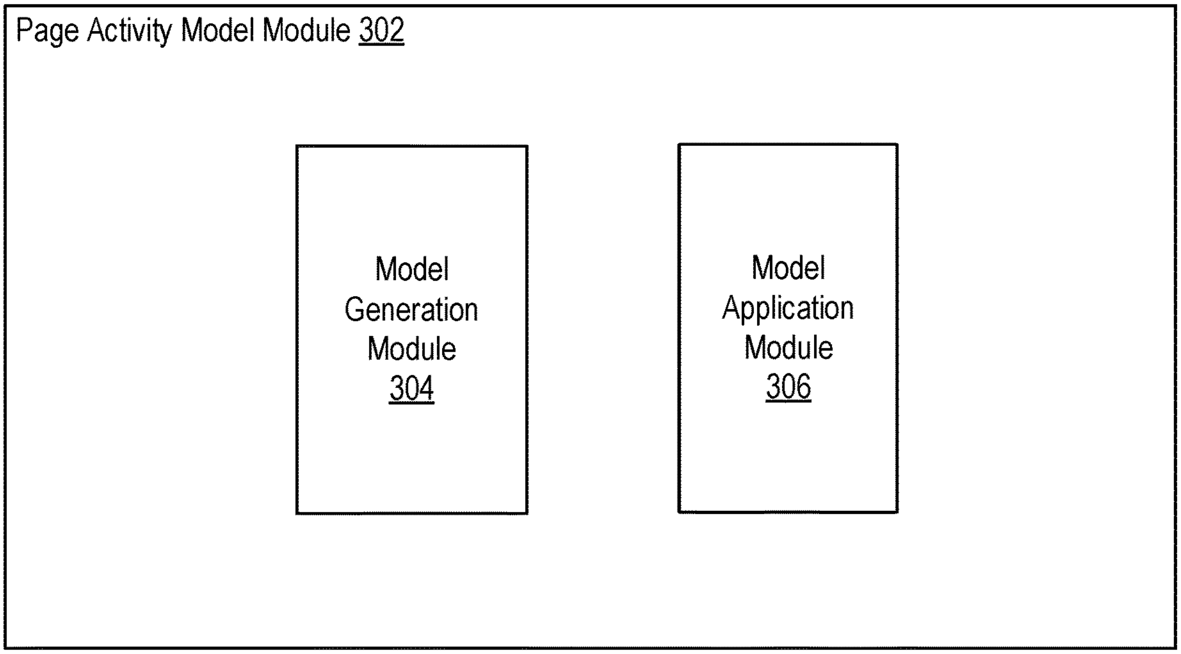
FIG. 3 illustrates an example page activity model module, according to an embodiment of the present disclosure.

FIG. 3 illustrates an example page activity model module 302 configured to generate and apply a predicted activity objective value model, according to an embodiment of the present disclosure. In some embodiments, the page activity model module 106 of FIG. 1 can be implemented as the example page activity model module 302. As shown in FIG. 3, the page activity model module 302 can include a model generation module 304 and a model application module 306.

The model generation module 304 can be configured to analyze past social networking system data to generate a predicted activity objective value model. An example process for generating an objective value model is described in Piepgrass, incorporated by reference above. As described in greater detail in Piepgrass, the model generation module 304 can be configured to analyze past data from the social networking system to compare a control group and a test group to determine whether various features have an effect on administrator activity, and to what extent.

The predicted activity objective value model is designed to output activity scores that represent, for a particular candidate entity, a probability that an administrator of an entity page will be active on a social networking system in a particular period of time by analyzing various factors. For example, an activity score could provide a probability calculation of an administrator of Nike's page on a social networking system posting content to the Nike page in the next 24 hours. Furthermore, by varying the values of the various factors, the predicted activity objective value model can be used to predict the change in probability of administrator activity as a result of changes to one or more factors. For example, if the number of followers of an entity page is one of the factors utilized to calculate activity score, then an activity score can be calculated for a first number of followers value (e.g., the current number of followers for an entity page), and then calculate again for a second number of followers value (e.g., if the entity page gained 10 followers). The two different activity score calculations can be used to determine whether the change in the number of followers leads to a positive result (e.g., an increase in the likelihood of administrator activity), and how much of a change results from the change in the number of followers. In various embodiments, the predicted activity objective value model can be trained using a gradient boosting decision tree model for predicting an activity score, for example, between 0-1, indicative of how likely an administrator is to be active in a future time period (e.g., in the next day, week, etc.)

As mentioned above, the output of the predicted activity objective value model can be based on a variety of different features. For example, these features can include: past administrator activity on the entity page, third-party activity and engagement on the entity page (e.g., viewers or fans), the size of the entity page (e.g., number of fans or followers), the age of the entity page, topics associated with the entity page, growth or decline in administrator and/or third-party engagement with the entity page, and the like. Each of these features can be incorporated into the predicted activity objective value model such that the activity score is calculated based on feature values for each of these features. The predicted activity objective value model can be trained to determine feature importance scores quantifying how important each feature is for predicting future administrator activity.

The predicted activity objective value model can also be configured to output an activity score delta, which indicates the change in activity score caused by a change in a particular feature value. This can be carried out by calculating an activity score with the feature value set to a first value, and then calculating an activity score with the feature value set to a second value, while other features are kept constant, and then calculating the difference in activity scores. As discussed above, the activity score is indicative of how likely an administrator is to be active in a given future time period (e.g., in the next day, week, etc.). As such, the activity score delta, i.e., the difference in activity scores for two different sets of feature values in which one feature value has been changed while all others are kept constant, is indicative of how the particular change in feature value leads to a change in the probability of administrator activity for a given future time period. Administrator activity, as discussed above, is valuable to a social networking system because administrator activity leads to more content on a social networking system, more user engagement on the social networking system, and more opportunities for engagement between users and entities. As such, calculation of the activity score delta can provide valuable information regarding whether or not additional followers would likely result in more activity by an administrator. This information can be used to help determine which pages should be recommended to a particular user in order to maximize value to the social networking system. Although the present disclosure discusses calculating a difference between two activity scores, it should be understood that any comparative measure of the two activity scores may be used. For example, in various embodiments, a ratio or proportion of activity scores may be used.

Consider an example in which the feature being increased or decreased is the number of followers of a candidate entity. The predicted activity objective value model can be utilized to calculate the probably of administrator activity in the next week given the candidate entity's current number of followers, i.e. an activity score based on the candidate entity's current number of followers. The model can then be used to calculate the candidate entity's activity score if the number of followers is increased by 1 follower, or 2 followers, and so on. The change in the activity score, i.e., the activity score delta, provides a quantitative representation of value being provided by the increase in number of followers. For example, the predicted activity objective value model can be used to determine that a given candidate entity has an activity score of 0.25, indicating that the candidate entity has a 25% likelihood of administrator activity in the next week. The predicted activity objective value model can then be used to determine that if the candidate entity gains one additional follower, the candidate entity's activity score jumps to 0.39 (an increase of 0.14, or 14%, as a result of the first additional follower), and if the candidate entity gains a second additional follower, the candidate entity's activity score jumps to to 44% (an increase of 0.05, or 5%, as a result of the second additional follower), and so on. In this way, the predicted activity objective value model and the output activity score delta can be used to determine the likely "benefit" conferred by a particular user becoming a follower of a candidate entity.

The model application module 306 can be configured to apply the predicted activity objective value model to each candidate entity in order to determine which page or pages to recommend to a particular user. The model application module 306 can apply the predicted activity objective value module by first gathering data representing the various feature values for each candidate entity. For example, if the predicted activity objective value module calculates an activity score based on number of followers, number of posts posted by an administrator in the past week, the number of third-party posts on the candidate entity's page in the past week, and the number of times an administrator has logged on in the past month, the model application module 306 can gather all of this information for each candidate entity. The collected information, i.e., the collected feature values, are then used by the predicted activity objective value model to calculate an initial activity score for each candidate entity. A second activity score can then be calculated for each candidate entity using a second set of feature values in which one or more of the feature values has been changed. For example, the number of followers can be increased by one, to determine whether one additional follower will result in any change to the initial activity score. An activity score delta is then computed for each candidate entity using the initial activity score and the second activity score. The activity score delta provides an indication of how much an administrator's activity probability increases if the user is "converted" into a follower of the candidate entity page. Although in this example, "conversion" will be referred to as getting a particular user to follow or otherwise connect with a candidate entity's page, the definition of "conversion" can be tailored according to the needs of the entity and/or the social networking system. For example, a "conversion" might comprise a user simply visiting the candidate entity's page, or posting content (e.g., a comment) to the candidate entity's page.

As discussed above, the activity score delta is indicative of the expected change in administrator activity probability if a particular user is converted. However, simply making an entity recommendation to a user does not guarantee that the user will be converted, i.e., begin following the candidate entity. For this reason, the activity score delta may not be an accurate or reliable prediction of the value provided by recommending a candidate entity to the user. For example, even if the activity score delta is the maximum value of 1.0, indicating that the administrator's probability of activity jumps from 0% to 100%, this can lack consequential importance if the chances of a user conversion based on an entity recommendation are low or zero, i.e., the user will not follow the candidate entity even if shown an entity recommendation. As such, the model application module 306 can be configured to calculate an estimated activity value for each candidate entity by applying a conversion probability to each candidate entity's activity score delta. The conversion probability represents the likelihood that the user will be converted if the user is presented with a recommendation for the candidate entity. The conversion probability may be a customized or uniquely calculated value for each user-candidate entity pairing. In certain embodiments, the conversion probability can be calculated by comparing various characteristics of the user and the candidate entity and determining how likely it is for the user to follow the candidate entity if presented with a recommendation. In a simplified example, it may be determined that for a candidate entity that is a dog (e.g., an entity page for a dog Boo), a user who has followed several other dog-related entity pages has a high conversion probability, while a user who has expressed a dislike for dogs has a relatively low conversion probability. The estimated activity value can be calculated, for example, by multiplying the conversion probability with the activity score delta.

The set of candidate entities can be ranked, sorted, filtered, and/or selected for recommendation based on the estimated activity value. For example, the candidate entities can be ranked based on each candidate entity's estimated activity value, and the top candidate entity, or all candidate entities above a ranking threshold can be selected for recommendation to the user. In another example, all candidate entities satisfying an estimated activity value threshold can be selected for recommendation to the user.

In certain embodiments, multiple objective value models can be utilized by a recommendation system, with each objective value model providing one measure of the estimated "value" of the recommendation. As such, the estimated activity value can make up one component of an overall recommendation value rating, which combines the estimated values of multiple objective value models. Recommendation of a page to the user may be made based on the estimated activity value on its own, or based on the overall recommendation value rating, which comprises the estimated activity value.

Entity recommendations for candidate entities that are selected for recommendation may be presented to the user via a user interface. In various embodiments, entity recommendations may be presented in a user's news feed on a social networking system, and/or as an advertisement on the social networking system. An entity recommendation may include a selectable portion that allows the user to visit the candidate entity's page on the social networking system and/or allow the user to follow or otherwise connect with the candidate entity's page on the social networking system.

Figure 4:
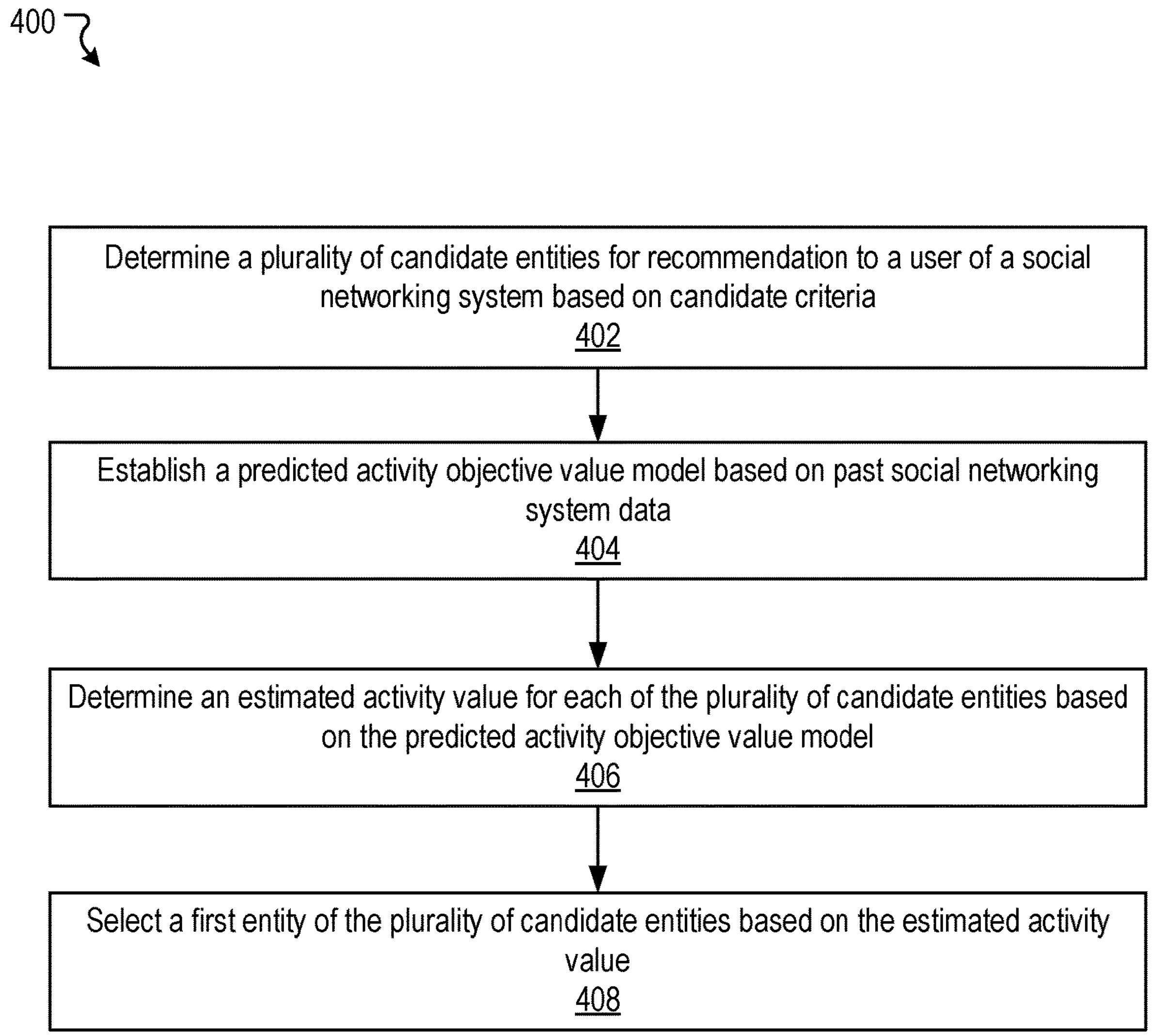
FIG. 4 illustrates an example method for selecting a candidate entity based on a predicted activity objective value model, according to an embodiment of the present disclosure.

FIG. 4 illustrates an example method 400 associated with selecting an entity for recommendation to a user, according to an embodiment of the present disclosure. It should be appreciated that there can be additional, fewer, or alternative steps performed in similar or alternative orders, or in parallel, based on the various features and embodiments discussed herein unless otherwise stated.

At block 402, the example method 400 can determine a plurality of candidate entities for recommendation to a user of a social networking system based on candidate criteria. At block 404, the example method 400 can establish a predicted activity objective value model based on past social networking system data. At block 406, the example method 400 can determine an estimated activity value for each of the plurality of candidate entities based on the predicted activity objective value model. At block 408, the example method 400 can select a first entity of the plurality of candidate entities based on the estimated activity value. Other suitable techniques that incorporate various features and embodiments of the present technology are possible.

Figure 5:
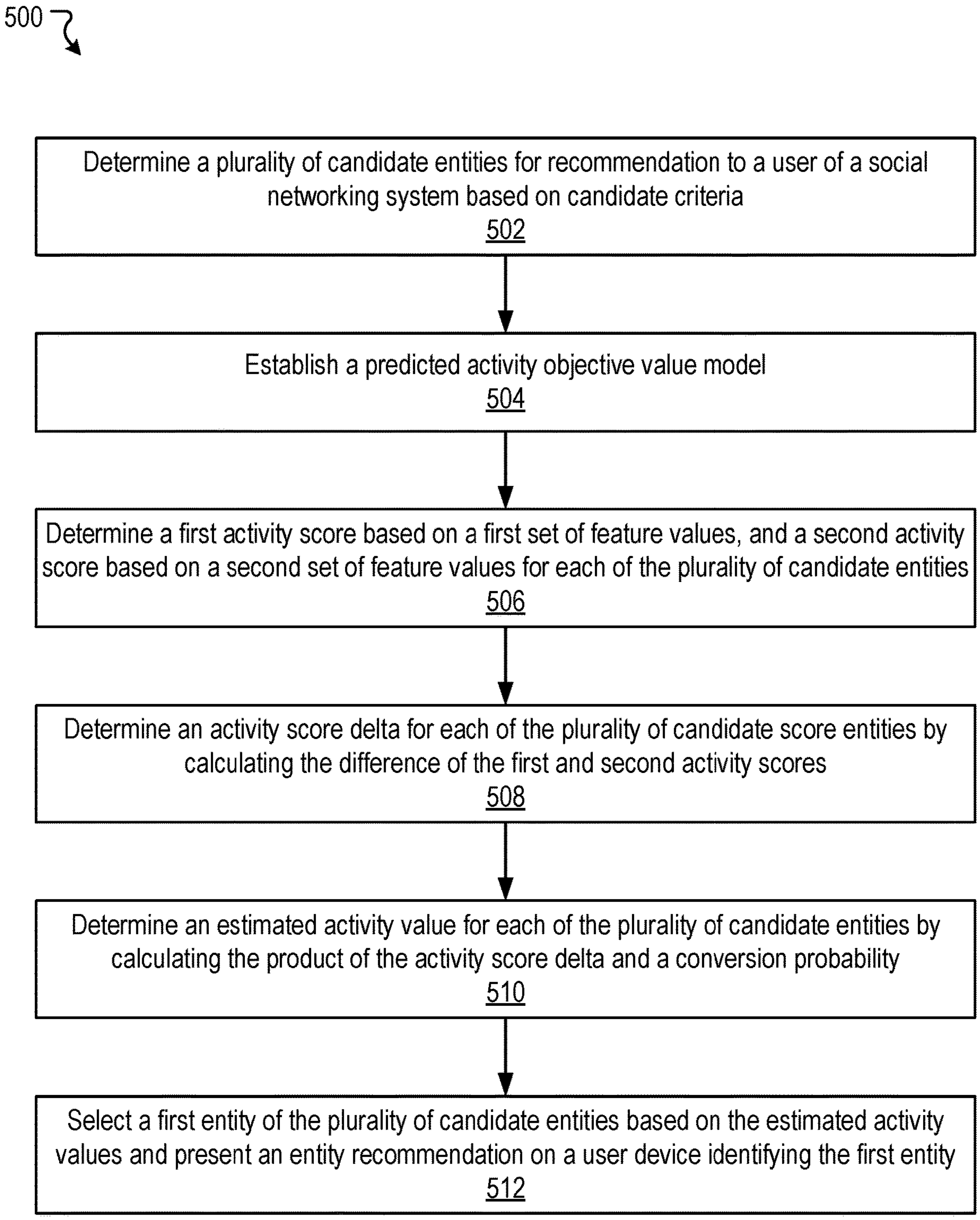
FIG. 5 illustrates an example method for presenting an entity recommendation, according to an embodiment of the present disclosure.

FIG. 5 illustrates an example method 500 associated with selecting and presenting an entity recommendation to a user, according to an embodiment of the present disclosure. It should be appreciated that there can be additional, fewer, or alternative steps performed in similar or alternative orders, or in parallel, based on the various features and embodiments discussed herein unless otherwise stated.

At block 502, the example method 500 can determine a plurality of candidate entities for recommendation to a user of a social networking system based on candidate criteria. At block 504, the example method 500 can establish a predicted activity objective value model. At block 506, the example method 500 can determine a first activity score based on a first set of feature values, and a second activity scored based on a second set of feature values for each of the plurality of candidate entities. At block 508, the example method 500 can determine an activity score delta for each of the plurality of candidate score entities by calculating the difference of the first and second activity scores. At block 510, the example method 500 can determine an estimated activity value for each of the plurality of candidate entities by calculating the product of the activity score delta and a conversion probability. At block 512, the example method 500 can select a first entity of the plurality of candidate entities based on the estimated activity values and present an entity recommendation on a user device identifying the first entity. Other suitable techniques that incorporate various features and embodiments of the present technology are possible.

Social Networking System—Example Implementation

Figure 6:
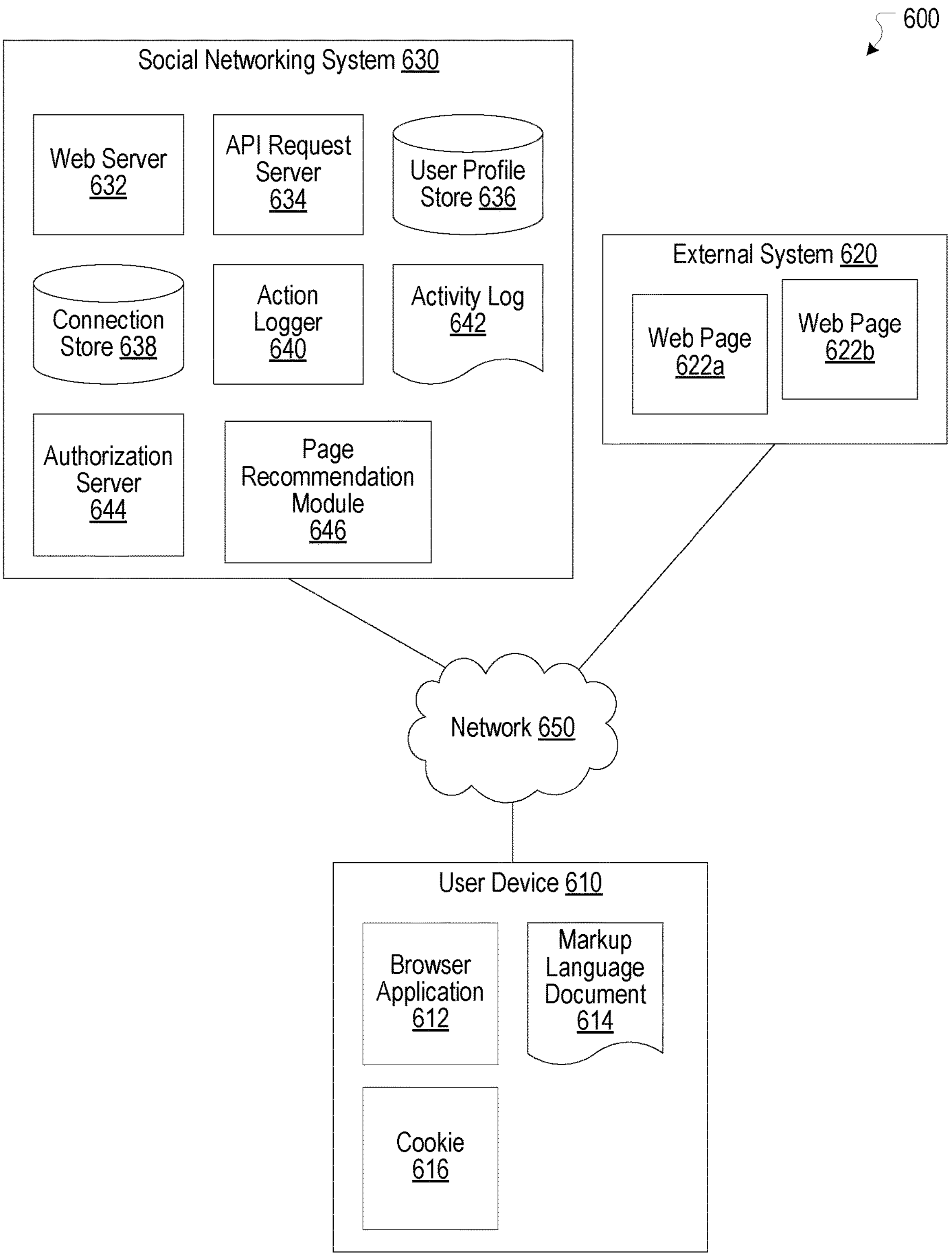
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622*a*, 622*b*, which are communicated to the user device 610 using the network 650. The external system 620 is separate from the social networking system 630. For example, the external system 620 is associated with a first domain, while the social networking system 630 is associated with a separate social networking domain. Web pages 622*a*, 622*b*, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a page recommendation module 646. The page recommendation module 646 can, for example, be implemented as the page recommendation module 102, as discussed in more detail herein. As discussed previously, it should be appreciated that there can be many variations or other possibilities. For example, in some embodiments, one or more functionalities of the page recommendation module 646 can be implemented in the user device 610.

Hardware Implementation

Figure 7:
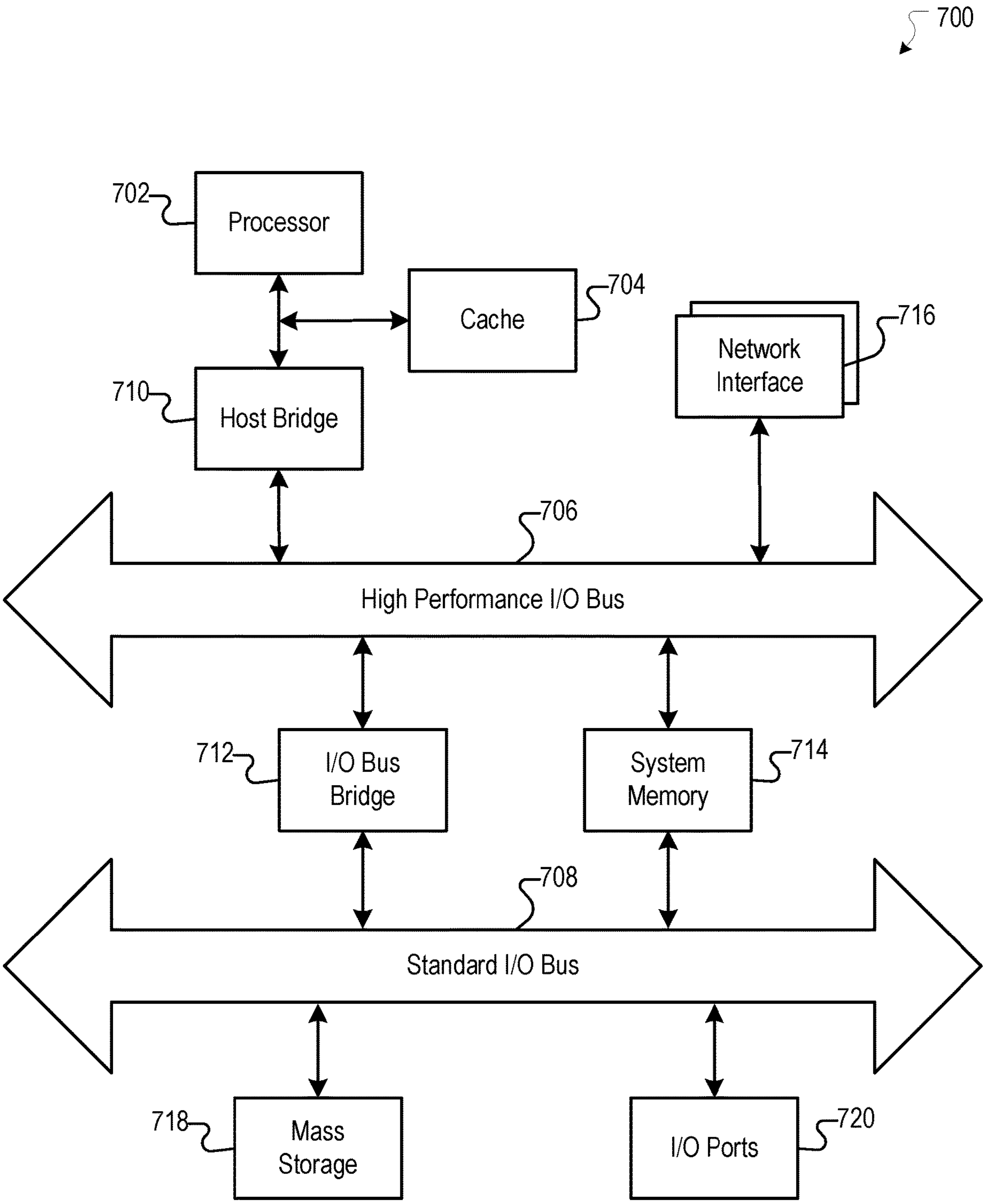
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:

determining, by a computing system, a plurality of candidate entities for recommendation to a user of a social networking system based on candidate criteria, wherein each of the plurality of candidate entities is associated with a corresponding page on the social networking system;

establishing, by the computing system, a predicted activity objective value model configured to calculate activity scores indicative of the probability of future activity on the social networking system by a candidate entity, wherein the predicted activity objective value model is trained using a machine learning technique;

determining, by the computing system, a first activity score for each of the plurality of candidate entities based on a first set of feature values provided to the predicted activity objective value model;

determining, by the computing system, a second activity score for each of the plurality of candidate entities based on a second set of feature values provided to the predicted activity objective value model, the second set of feature values different from the first set of feature values;

determining, by the computing system, an activity score delta for each candidate entity of the plurality of candidate entities, the activity score delta comprising a difference of the second activity score and the first activity score for each candidate entity of the plurality of candidate entities indicative of a change in probability of future activity on the social networking system by the candidate entity caused by providing the second set of feature values to the predicted activity objective value model instead of the first set of feature values; and selecting, by the computing system, a corresponding page associated with a first entity of the plurality of candidate entities based on the activity score deltas to recommend to the user so that a connection between the user and the corresponding page associated with the first entity is formed on the social networking system.

2. The computer-implemented method of claim 1, wherein, the first set of feature values comprises a first number of followers value indicative of a current number of followers for each of the plurality of candidate entities, and the second set of feature values comprises a second number of followers value, in which the first number of followers value is increased.

3. The computer-implemented method of claim 1, further comprising determining an estimated activity value for each of the plurality of candidate entities, the estimated activity value comprising a product of the activity score delta and a conversion probability for each of the plurality of candidate entities, wherein selecting a first entity of the plurality of candidate entities is based on the estimated activity values.

4. The computer-implemented method of claim 3, wherein selecting a first entity of the plurality of candidate entities comprises ranking the plurality of candidate entities based on the estimated activity values.

5. The computer-implemented method of claim 1, wherein determining a plurality of candidate entities for recommendation to a user of the social networking system comprises determining a plurality of candidate entities that are not connected to the user on the social networking system.

6. The computer-implemented method of claim 1, further comprising causing an entity recommendation identifying the first entity to be presented to the user through a user device.

7. The computer-implemented method of claim 6, further comprising causing an entity page on the social networking system associated with the first entity to be presented to the user based on a selection by the user.

8. The computer-implemented method of claim 6, further comprising causing the user to connect with an entity page on the social networking system associated with the first entity based on a selection by the user.

9. The computer-implemented method of claim 1, wherein establishing a predicted activity objective value model comprises training a gradient boosting decision tree.

10. A system comprising:

at least one processor; and a memory storing instructions that, when executed by the at least one processor, cause the system to perform a method comprising:

determining a plurality of candidate entities for recommendation to a user of a social networking system based on candidate criteria, wherein each of the plurality of candidate entities is associated with a corresponding page on the social networking system;

establishing a predicted activity objective value model configured to calculate activity scores indicative of the probability of future activity on the social networking system by a candidate entity, wherein the predicted activity objective value model is trained using a machine learning technique;

determining a first activity score for each of the plurality of candidate entities based on a first set of feature values provided to the predicted activity objective value model;

determining a second activity score for each of the plurality of candidate entities based on a second set of feature values provided to the predicted activity objective value model, the second set of feature values different from the first set of feature values;

determining an activity score delta for each candidate entity of the plurality of candidate entities, the activity score delta comprising a difference of the second activity score and the first activity score for each candidate entity of the plurality of candidate entities indicative of a change in probability of future activity on the social networking system by the candidate entity caused by providing the second set of feature values to the predicted activity objective value model instead of the first set of feature values; and selecting a corresponding page associated with a first entity of the plurality of candidate entities based on the activity score deltas to recommend to the user so that a connection between the user and the corresponding page associated with the first entity is formed on the social networking system.

11. The system of claim 10, wherein the first set of feature values comprises a first number of followers value indicative of a current number of followers for each of the plurality of candidate entities, and the second set of feature values comprises a second number of followers value, in which the first number of followers value is increased.

12. The system of claim 10, wherein the method further comprises determining an estimated activity value for each of the plurality of candidate entities, the estimated activity value comprising a product of the activity score delta and a conversion probability for each of the plurality of candidate entities, and further wherein, selecting a first entity of the plurality of candidate entities is based on the estimated activity values.

13. The system of claim 12, wherein selecting a first entity of the plurality of candidate entities comprises ranking the plurality of candidate entities based on the estimated activity values.

14. A non-transitory computer-readable storage medium including instructions that, when executed by at least one processor of a computing system, cause the computing system to perform a method comprising:

determining a plurality of candidate entities for recommendation to a user of a social networking system based on candidate criteria, wherein each of the plurality of candidate entities is associated with a corresponding page on the social networking system;

establishing a predicted activity objective value model configured to calculate activity scores indicative of the probability of future activity on the social networking system by a candidate entity, wherein the predicted activity objective value model is trained using a machine learning technique;

determining a first activity score for each of the plurality of candidate entities based on a first set of feature values provided to the predicted activity objective value model;

determining a second activity score for each of the plurality of candidate entities based on a second set of feature values provided to the predicted activity objective value model, the second set of feature values different from the first set of feature values;

determining an activity score delta for each candidate entity of the plurality of candidate entities, the activity score delta comprising a difference of the second activity score and the first activity score for each candidate entity of the plurality of candidate entities indicative of a change in probability of future activity on the social networking system by the candidate entity caused by providing the second set of feature values to the predicted activity objective value model instead of the first set of feature values; and selecting a corresponding page associated with a first entity of the plurality of candidate entities based on the activity score deltas to recommend to the user so that a connection between the user and the corresponding page associated with the first entity is formed on the social networking system.

15. The non-transitory computer-readable storage medium of claim 14, wherein the first set of feature values comprises a first number of followers value indicative of a current number of followers for each of the plurality of candidate entities, and the second set of feature values comprises a second number of followers value, in which the first number of followers value is increased.

16. The non-transitory computer-readable storage medium of claim 14, wherein the method further comprises determining an estimated activity value for each of the plurality of candidate entities, the estimated activity value comprising a product of the activity score delta and a conversion probability for each of the plurality of candidate entities, and further wherein, selecting a first entity of the plurality of candidate entities is based on the estimated activity values.

17. The non-transitory computer-readable storage medium of claim 16, wherein selecting a first entity of the plurality of candidate entities comprises ranking the plurality of candidate entities based on the estimated activity values.

* * * * *